(12) United States Patent
King

(10) Patent No.: US 9,861,911 B2
(45) Date of Patent: Jan. 9, 2018

(54) THICKENER DILUTION TUBE

(71) Applicant: Summit Mining International, Denver, CO (US)

(72) Inventor: David Warren King, Angels Camp, CA (US)

(73) Assignee: Summit Mining International, Denver, CO (US)

( * ) Notice: Subject to any disclaimer, the term of this patent is extended or adjusted under 35 U.S.C. 154(b) by 0 days.

(21) Appl. No.: 13/654,314

(22) Filed: Oct. 17, 2012

(65) Prior Publication Data

US 2014/0102963 A1 Apr. 17, 2014

(51) Int. Cl.
*B01D 21/24* (2006.01)
*B01D 21/06* (2006.01)
*B01D 21/34* (2006.01)
*B01D 21/30* (2006.01)

(52) U.S. Cl.
CPC ......... *B01D 21/06* (2013.01); *B01D 21/2405* (2013.01); *B01D 21/2427* (2013.01); *B01D 21/34* (2013.01); *B01D 21/24* (2013.01); *B01D 21/2488* (2013.01); *B01D 21/30* (2013.01)

(58) Field of Classification Search
None
See application file for complete search history.

(56) References Cited

U.S. PATENT DOCUMENTS

| 4,173,536 A * | 11/1979 | McCall | 210/242.3 |
| 4,269,438 A * | 5/1981 | Ridenour | 285/382.2 |
| 5,512,133 A * | 4/1996 | Markham | 162/4 |
| 5,556,238 A | 9/1996 | Chinh | |
| 5,893,970 A | 4/1999 | Wood et al. | |
| 7,041,213 B1 * | 5/2006 | McClanahan | 210/85 |
| 7,520,995 B2 | 4/2009 | Taylor et al. | |
| 7,988,865 B2 | 8/2011 | Laros et al. | |
| 2004/0026333 A1 * | 2/2004 | Ruehrwein | B01D 21/08 210/744 |

(Continued)

FOREIGN PATENT DOCUMENTS

GB 2 374 297 A 10/2002
WO WO-2010/037162 A1 4/2010

(Continued)

OTHER PUBLICATIONS

International Search Report dated Feb. 19, 2014, for PCT Application No. PCT/US13/65129, filed Oct. 15, 2013, four pages.

*Primary Examiner* — Richard Gurtowski
(74) *Attorney, Agent, or Firm* — Morrison & Foerster LLP

(57) ABSTRACT

One or more dilution tubes for increasing the dilution of pulp as it enters a thickener are provided. One or more pipes, referred to here as dilution tubes, can be added to sides of a feed pipe of a thickener. One end of a dilution tube can open to a tank of the thickener, and the other end can open into the feed pipe. As pulp flows through the feed pipe, low pressure suction can be created that pulls water from the tank, through the dilution tube, and into the feed pipe. The water pulled in through the dilution tube can increase the dilution of the pulp. A highly diluted pulp can contact a flocculent efficiently and lead to a high settling rate in a thickener. Accordingly, the use of dilution tubes can increase the efficiency of a thickener.

10 Claims, 4 Drawing Sheets

(56) References Cited

U.S. PATENT DOCUMENTS

| | | | |
|---|---|---|---|
| 2006/0006114 A1* | 1/2006 | Deskins | B01D 21/0012 210/724 |
| 2011/0132846 A1* | 6/2011 | Laros | B01D 21/0021 210/702 |
| 2012/0012534 A1 | 1/2012 | Turner | |

FOREIGN PATENT DOCUMENTS

| WO | WO-2012/110766 A2 | 8/2012 |
|---|---|---|
| WO | WO-2014/062735 A1 | 4/2014 |

* cited by examiner

THICKENER DILUTION TUBE

FIELD OF THE DISCLOSURE

This relates generally to one or more dilution tubes for increasing the dilution of pulp as it enters a thickener.

BACKGROUND OF THE DISCLOSURE

A thickener may be used in industrial plants to recover liquid from pulp, which is a mixture of solids and liquid. For example, water used in mineral processing can become mixed in a pulp. The use of a thickener to recover the water from the pulp byproduct can allow the water to be reused in further mineral processing. A thickener can be a large, round, relatively shallow settling tank with a bottom that slopes toward the center. Settling tanks can be 50 meters in diameter, for example, with some as large as 200 meters in diameter. Pulp can enter the thickener through a feed pipe into a feed well in the center of the thickener, where the pulp can then enter the tank. The solids of the pulp can drop to the bottom of the tank where a slowly rotating rake mechanism can move the settled solids toward a central discharge outlet. Overflow liquid that has been separated from the solids can be collected in a peripheral trough and directed to a pipe outlet for recycling.

Additionally, a chemical flocculent can be added to the pulp to increase the settling rate. The flocculent can cause fine solid particles to bind together and settle more quickly. The efficiency of the thickener may rely on the ability of flocculent to contact the particles to allow for this agglomeration. There can be greater chance of agglomeration when the pulp is diluted as much as possible in the feed pipe, at times as low as 10% solids, for example. As such, a diluted feed pipe can allow for a more efficient solid particle surface contact with the flocculent and thus a faster settling rate.

SUMMARY OF THE DISCLOSURE

This relates to one or more dilution tubes for increasing the dilution of pulp as it enters a thickener. One or more pipes, referred to here as dilution tubes, can be added to sides of a feed pipe of a thickener. One end of a dilution tube can open to a tank of the thickener, and the other end can open into the feed pipe. As pulp flows through the feed pipe, low pressure suction can be created that pulls water from the tank, through the dilution tube, and into the feed pipe. The water pulled in through the dilution tube can increase the dilution of the pulp. A highly diluted pulp can contact a flocculent efficiently and lead to a high settling rate in a thickener. Accordingly, the use of dilution tubes can increase the efficiency of a thickener. In some embodiments, a valve can be coupled to a dilution tube to allow flow control of the dilution tube. For example, the valves may be closed as pulp is first introduced to the thickener and then opened once the tank is full.

DETAILED DESCRIPTION

In the following description of embodiments, reference is made to the accompanying drawings which form a part hereof, and in which it is shown by way of illustration specific embodiments that can be practiced. It is to be understood that other embodiments can be used and structural changes can be made without departing from the scope of the disclosed embodiments.

Various embodiments relate to one or more dilution tubes for increasing the dilution of pulp as it enters a thickener. One or more pipes, referred to here as dilution tubes, can be added to sides of a feed pipe of a thickener. One end of a dilution tube can open to a tank of the thickener, and the other end can open into the feed pipe. As pulp flows through the feed pipe, low pressure suction can be created that pulls water from the tank, through the dilution tube, and into the feed pipe. The water pulled in through the dilution tube can increase the dilution of the pulp. A highly diluted pulp can contact a flocculent efficiently and lead to a high settling rate in a thickener. Accordingly, the use of dilution tubes can increase the efficiency of a thickener. In some embodiments, a valve can be coupled to a dilution tube to allow flow control of the dilution tube. For example, the valves may be closed as pulp is first introduced to the thickener and then opened once the tank is full.

Although embodiments disclosed herein may be described and illustrated herein primarily in terms of mineral processing, it should be understood that the embodiments are not so limited, but are additionally applicable to other industrial implementations, such as sewage treatment.

Figure 1:
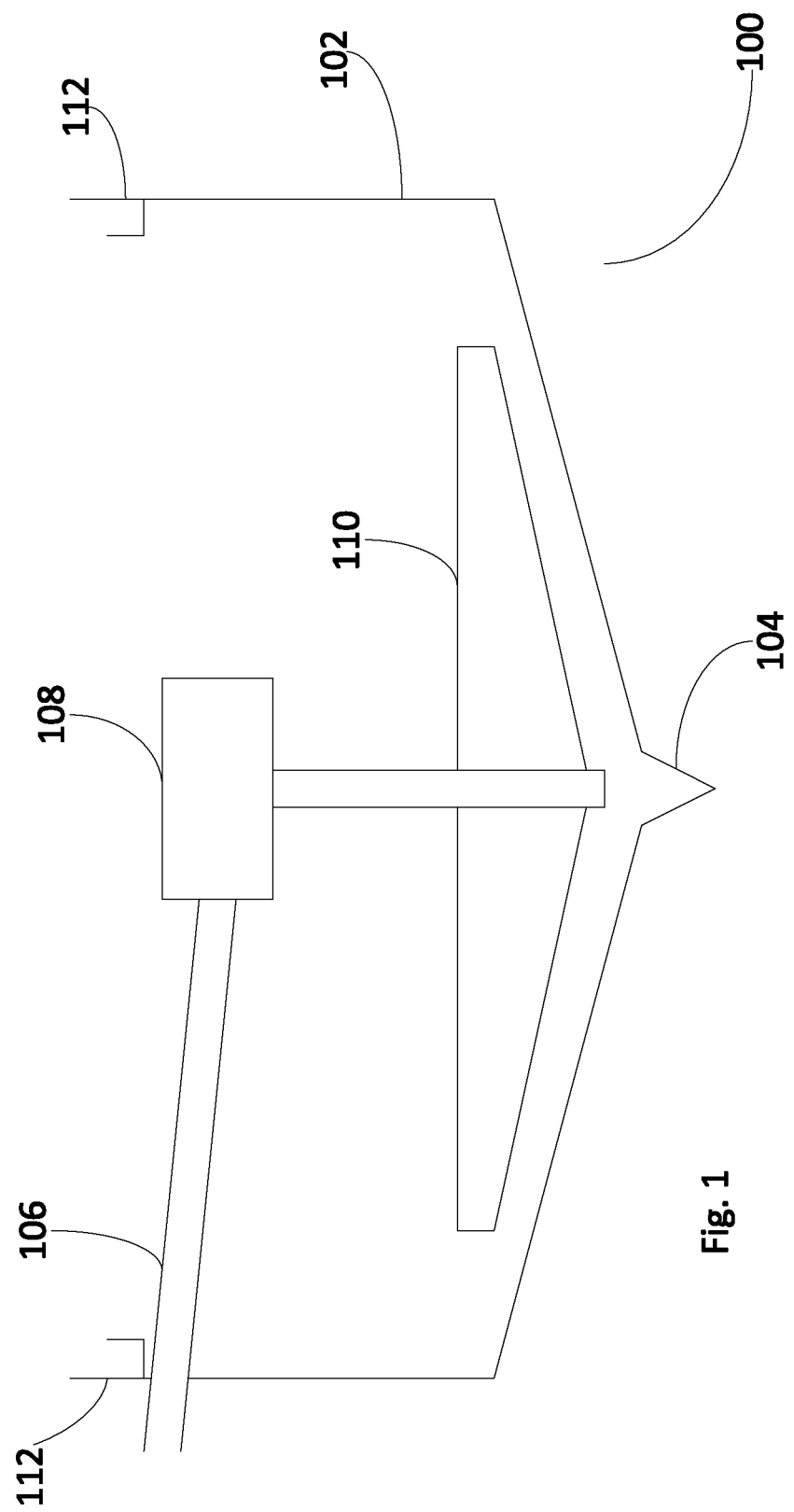
FIG. 1 illustrates an exemplary thickener according to embodiments of the disclosure.

FIG. 1 illustrates an exemplary thickener 100 according to embodiments of the disclosure. The thickener 100 can have a settling tank 102 with a bottom that slopes toward a central discharge outlet 104. Pulp can be introduced to the thickener through a feed pipe 106 that channels pulp to a feed well 108 located centrally in the thickener 100. Pulp then passes from the feed well 108 into the settling tank 102. Solids of the pulp can drop to the bottom of the tank 102 where a slowly rotating rake 110 can move the settled solids toward the central discharge outlet 104. After separating from the solids, overflow liquid can be collected in a peripheral trough 112 and directed to a pipe outlet for recycling.

Figure 2:
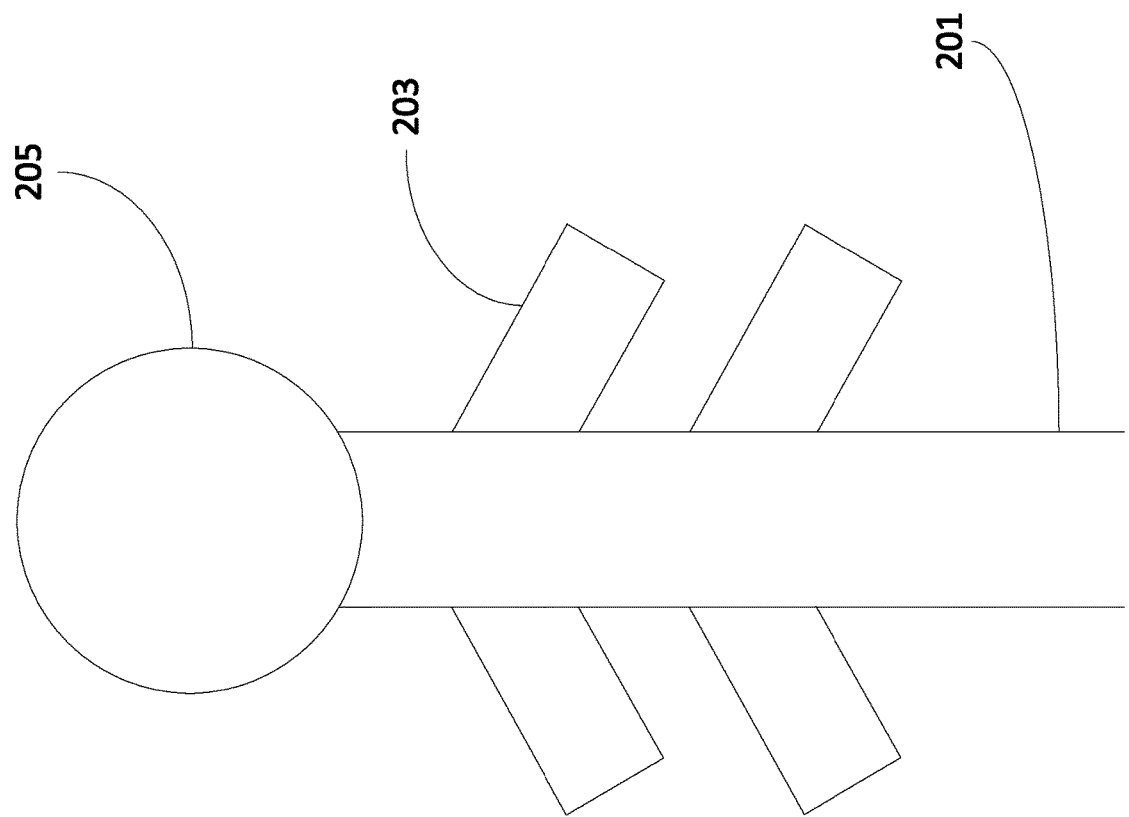
FIG. 2 illustrates an exemplary feed pipe with dilution tubes according to embodiments of the disclosure.

Additionally, the feed pipe 106 can include one or more dilution tubes. FIG. 2 illustrates a feed pipe 201 with dilution tubes according to embodiments of the disclosure. A dilution tube 203 can open on one end to the settling tank of the thickener, and the other end can open into the feed pipe 201. As pulp flows through the feed pipe 201 towards a feed well 205, low pressure suction can be created that pulls water from the tank, through the dilution tube, and into the feed pipe. The water pulled in through the dilution tube can increase the dilution of the pulp. As discussed above, a highly diluted pulp can contact flocculent efficiently and lead to a high settling rate in the thickener.

Location, spacing, and angle of a dilution tube can be varied to increase the flow of water through the dilution tube into the feed pipe. In some embodiments, the dilution tube 203 can jut out from the feed pipe 201 in a direction opposite the flow of pulp through the dilution tube. In this way, water flowing through the dilution tube 203 can flow in largely the same direction as the pulp flowing through the feed pipe 201. Additionally, in some embodiments, the dilution tube 203 can jut out from the feed pipe 201 at an angle 60 degrees to the feed pipe. Alternative embodiments can employ different jutting angles to optimize dilution of the pulp. For example, jutting angles in the range of 40-43 degrees may be appropriate.

The length of each dilution tube may be different. For example, a first tube may be 1,550 millimeters long, a second tube may be 1,570 millimeters long, a third tube may be 1,595 millimeters long, and a final tube may be 1,610 millimeters long. The spacing of the dilution tubes may also be varied. For example, a first tube may be 810 millimeters from a second tube, and the second tube may be 1,210 millimeters from a third tube. In some examples, tubes may located between 1100-1800 millimeters from the feed well and 140-160 millimeters from the top of the feed pipe. Although these measurements are given as examples, various embodiments can have tubes of any length and spacing.

Although FIG. 2 illustrates a feed pipe 201 with four dilution tubes, various embodiments of the invention can have any number of dilution tubes, including just one single dilution tube.

Figure 3:
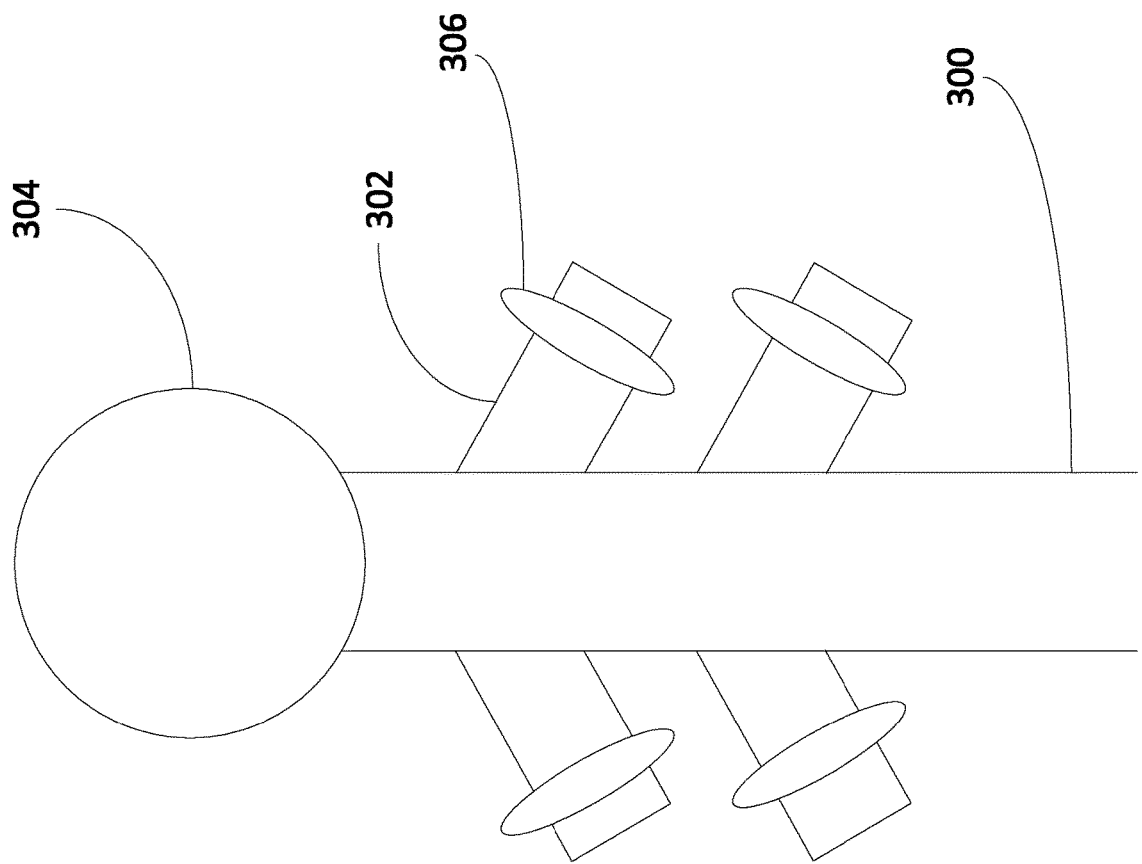
FIG. 3 illustrates an exemplary feed pipe with dilution tubes and valves according to embodiments of the disclosure.

In some embodiments, a dilution tube can include a valve to allow for dilution adjustment. FIG. 3 illustrates an exemplary feed pipe 300 with dilution tubes and valves according to embodiments of the disclosure. A dilution tube 302 can have a valve 306 to adjust the flow of the dilution tube. The valve 306 can be adjusted, either manually or automatically, to completely close the valve, partially close the valve, or completely open the valve. A partially closed valve can reduce the flow rate of a dilution tube, and a completely closed valve can block the flow of the dilution tube entirely.

In certain instances, it can be beneficial to adjust a valve of a dilution tube and thus the flow of the dilution tube. For example, when a settling tank is empty, no liquid will be present to flow through the dilution tubes. In such a case, it can be beneficial to close the valves of the dilution tubes. Once a settling tank is full enough that the opening of a dilution tube is submerged in liquid, the valve of the dilution tube can be opened to allow the liquid to flow through the dilution tube.

In some embodiments, the valves can be automated to open and close in response to changing information. Thickeners can be equipped with monitoring devices or other sensors to monitor liquid level, overflow, torque on the rake, pump pressures, solids percentage, flocculent addition, and other information. The valves can be automated to close when the liquid level falls below a closing threshold level. Additionally, the valves can be automated to open when the liquid level rises above an opening threshold level. In alternative embodiments, the valves can be partially opened or closed in response changing information. The automated closing and opening of valves can be implemented through the use of an electric motor, for example, or a hydraulic system.

Figure 4:
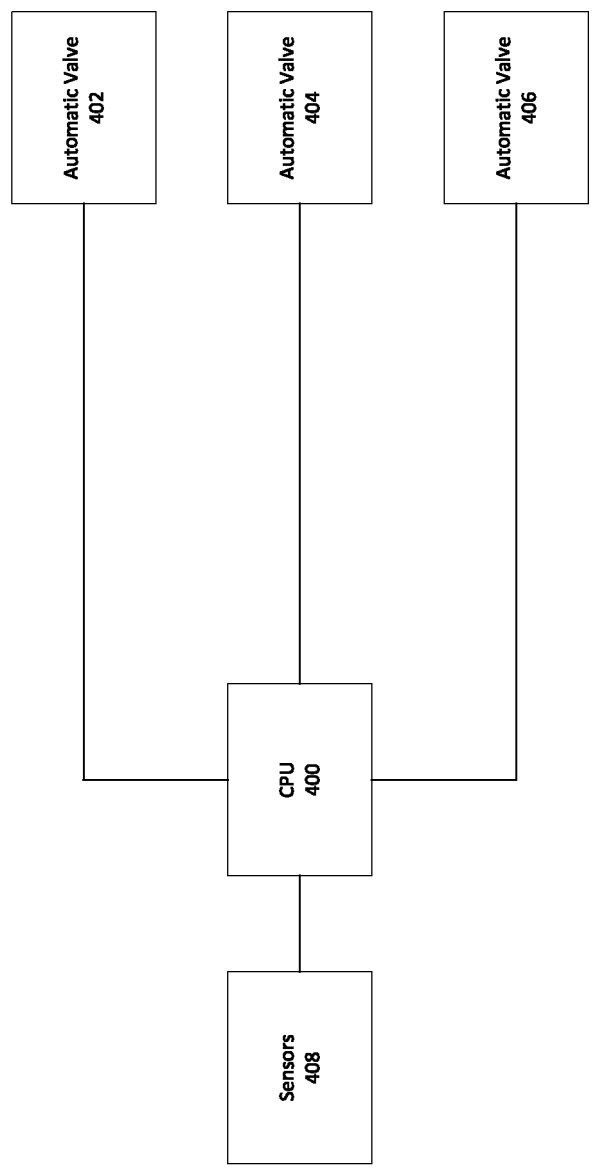
FIG. 4 illustrates an exemplary system of automatic valves according to embodiments of the disclosure.

As illustrated in FIG. 4, a CPU 400 can be connected to automatic valves 402, 404, and 406 to control the opening and closing of the automatic valves. The CPU can receive information from sensors 408 and determine, based on the information, whether to open or close each of the automatic valves 402, 404, and 406. In some embodiments, the CPU 400 can be a part of a main control system for several thickeners and/or other devices in a processing plant. Additionally, the sensors can be part of a monitoring system connected to a main control system.

The use of dilution tubes to increase the dilution of pulp entering the thickener can provide advantages over other methods of dilution. According to various embodiments, the dilution process can use liquid straight from the settling tank, so an external liquid source is unnecessary. This can be particularly important where the purpose of the thickener is to recycle liquid. Additionally, the dilution tubes can be simple to install on existing thickeners. Dilution tubes can be installed quickly in a normal thickener maintenance down period.

In practice, pulp has entered a feed pipe at 25% solids and exited the feed pipe at 15% solids after dilution from dilution tubes. Additionally, thickeners fitted with dilution tubes have reclaimed approximately 8,000 cubic meters of water per day more than prior to the installation of dilution tubes.

Although the disclosed embodiments have been fully described with reference to the accompanying drawings, it is to be noted that various changes and modifications will become apparent to those skilled in the art. Such changes and modifications are to be understood as being included within the scope of the disclosed embodiments as defined by the appended claims.

What is claimed is:

1. A method of operating a thickener apparatus, the thickener apparatus including a settling tank; a feed well; a feed pipe comprising an inlet end, an outlet end, and sides in between the inlet end and outlet end; and a dilution tube comprising a dilution pipe forming a dilution liquid passageway, the dilution pipe joining the feed pipe at an intersection of the dilution pipe and the feed pipe, the intersection delineating a length of pipe section of the feed pipe, the delineated length of pipe section forming a pulp passageway, the dilution pipe having a first opening into a side of the feed pipe at the delineated length of pipe section, a second opening into the settling tank, and a valve located between the first opening and the second opening, the first opening joining the dilution liquid passageway and the pulp passageway within the delineated length of pipe section, the method comprising:
   receiving pulp through the inlet end of the feed pipe;
   receiving the pulp from the outlet end of the feed pipe at the feed well;
   receiving the pulp from the feed well at the settling tank, wherein liquid separates from the pulp in the settling tank;
   pulling, based on low pressure suction created as pulp flows through the feed pipe from the inlet end to the outlet end, liquid from the settling tank into the dilution pipe through the second opening into the settling tank, through the dilution pipe, and into the side of the feed pipe at the delineated length of pipe section through the first opening of the dilution pipe, the pulled liquid for diluting pulp at the delineated length of pipe section of the feed pipe where the first opening joins the dilution liquid passageway and the pulp passageway within the delineated length of pipe section, and controlling flow of the pulled liquid through the dilution pipe by the valve.

2. The method of claim 1, wherein opening and closing of the valve is automated.

3. The method of claim 2, further comprising:
   automatically opening the valve of the dilution tube when a liquid level monitor indicates that a liquid level of the settling tank has risen above an opening threshold level.

4. The method of claim 1, wherein the dilution tube juts out from the feed pipe at an angle of 60 degrees.

5. The method of claim 2, wherein the opening and closing of the valve is based on a flow rate of the dilution tube.

6. A method of operating a thickener apparatus, the thickener apparatus including a settling tank; a feed well; a feed pipe comprising an inlet end, an outlet end, and sides in between the inlet end and outlet end; and a dilution tube comprising a dilution pipe joining the feed pipe at an intersection of the dilution pipe and the feed pipe, the intersection delineating a length of pipe section of the feed pipe in between an adjacent upstream length of pipe section and an adjacent downstream length of pipe section, the upstream, delineated, and downstream lengths of pipe sections forming a pulp passageway having a constant cross-sectional area, the dilution pipe having a first opening into a side of the feed pipe at the delineated length of pipe section, a second opening into the settling tank, and a valve located between the first opening and the second opening, the method comprising:
  receiving pulp through the inlet end of the feed pipe;
  receiving the pulp from the outlet end of the feed pipe at the feed well;
  receiving the pulp from the feed well at the settling tank, wherein liquid separates from the pulp in the settling tank;
  pulling, based on low pressure suction created as pulp flows through the feed pipe from the inlet end to the outlet end, liquid from the settling tank into the dilution pipe through the second opening into the settling tank, through the dilution pipe, and into the side of the feed pipe at the delineated length of pipe section through the first opening of the dilution pipe, the pulled liquid for diluting pulp at the delineated and downstream lengths of pipe sections of the feed pipe, and
  controlling flow of the pulled liquid through the dilution pipe by the valve.

7. The method of claim 6, wherein opening and closing of the valve is automated.

8. The method of claim 7, further comprising:
  automatically opening the valve of the dilution tube when a liquid level monitor indicates that a liquid level of the settling tank has risen above an opening threshold level.

9. The method of claim 6, wherein the dilution tube juts out from the feed pipe at an angle of 60 degrees.

10. The method of claim 8, wherein the opening and closing of the valve is based on a flow rate of the dilution tube.

* * * * *

UNITED STATES PATENT AND TRADEMARK OFFICE
CERTIFICATE OF CORRECTION

PATENT NO. : 9,861,911 B2
APPLICATION NO. : 13/654314
DATED : January 9, 2018
INVENTOR(S) : David Warren King It is certified that error appears in the above-identified patent and that said Letters Patent is hereby corrected as shown below:

In Claim 10, at Column 6, Line number 20, please delete "The method of claim 8" and replace with --The method of claim 7--.

Signed and Sealed this
Twenty-fourth Day of July, 2018

Andrei Iancu
*Director of the United States Patent and Trademark Office*